United States Patent [19]

Sakagami et al.

[11] Patent Number: 5,075,583

[45] Date of Patent: Dec. 24, 1991

[54] BRUSHLESS DC LINEAR MOTOR

[75] Inventors: Shigeru Sakagami, Nagoya; Toshiaki Onoyama, Nishio; Yoshiaki Nagasawa, Toyota; Toshihiro Andou, Okazaki, all of Japan

[73] Assignee: Toyota Shatai Kabushiki Kaisha, Aichi, Japan

[21] Appl. No.: 606,616

[22] Filed: Oct. 31, 1990

[30] Foreign Application Priority Data

Apr. 28, 1989 [JP] Japan ................................ 1-110953

[51] Int. Cl.$^5$ ........................................... H02K 41/02
[52] U.S. Cl. .................................. 310/12; 310/68 B; 318/135; 318/687
[58] Field of Search .......................... 310/12, 68 B, 14; 318/135, 771, 772, 687

[56] References Cited

U.S. PATENT DOCUMENTS

| 4,051,398 | 9/1977 | Kondo ..................................... 310/12 |
| 4,151,447 | 8/1979 | von der Heide et al. .......... 318/135 |
| 4,274,020 | 6/1981 | Parsch et al. .......................... 310/12 |
| 4,620,253 | 10/1986 | Garwin et al. ....................... 318/135 |
| 4,857,781 | 8/1989 | Shih ....................................... 310/12 |

Primary Examiner—Steven L. Stephan
Assistant Examiner—Edward H. To
Attorney, Agent, or Firm—Burns, Doane, Swecker & Mathis

[57] ABSTRACT

A brushless DC linear motor includes a coil unit in which electric flow terminals of each of three flat coils are connected with a star connection or with a delta connection; and the three flat coils have the same shape whose empty core section and winding section have their dimension of breadth determined on ½ of a magnetic pole-pitch of a magnetic body and are arranged in a shifted position of the magnetic pole-pitch by n/3 (n is a natural number excluding multiples of 3) on the coil unit. The motor also includes a sensor unit in which three magnetic detection sensors corresponding to the respective flat coils are arranged at intervals of ⅓+2m (m=0, 1, 2, 3, ...) of the magnetic pole-pitch and any of these magnetic detection sensors and its corresponding flat coils are arranged at the determined distance in accordance with the magnetic pole-pitch. In accordance with the signal from each of the sensors detecting the polarity of the magnet body, an electric flow switching means transfers the electric flow polarity to three terminals of a star connection or a delta connection.

8 Claims, 9 Drawing Sheets

CONDITION OF ELECTRIC FLOW (2)
(SHOWN IN POSITION OF SENSOR a)

BRUSHLESS DC LINEAR MOTOR

BACKGROUND OF THE INVENTION

The present invention relates to a brushless DC linear motor.

A brushless DC linear motor can send the current to coils without a brush. Therefore, it has such advantages that it is not accompanied by abrasion of brush part nor maintenance works, such as a change of a brush, and has no such bad effect upon electronic equipments as electric noises do generating when a brush switching the current. Thus, several suggestions have been made, as shown, for example, in Jpn. examined publication No. Toku-Ko-Sho 59-1061, and 61-24907 and the like.

Nevertheless, there are no brushless DC linear motor so far in use which has a coil unit comprising a set of three flat coils of the same shape containing an empty core section and a winding section and corresponding to a magnet body wherein several isometric magnets are arranged to alternate their magnetizing directions and put their magnetic pole-faces in a row in a perpendicular direction to this magnetizing direction. Moreover, it leaves more to be desired. Even in the case that the dimension of an empty core section and a winding section of flat coils and the mutual positional relationship among the three flat coils are precisely prescribed in reference to a magnetic pole-pitch of the magnet body and, further, the mutual positional relationship of three sensors detecting the relative relationship between the magnet body and the coil unit is prescribed in reference to the magnetic pole-pitch of the magnet body and the positional relationship between this sensor and the coil unit is specified, and a coil unit comprising a set of three flat coils is added to increase the thrust with the electric flow terminals of the three flat coils connected with a delta connection or a star connection, an additional sensor may be unnecessary to operate it. And in the case that a coil unit is added as aforementioned, only three wires connected to the three terminals of the delta connection or star connection may be necessary as the wiring to send the current.

SUMMARY OF THE INVENTION

In view of the foregoing, it is the main object of the present invention to provide a brushless DC linear motor which uses a coil unit comprising a set of three flat coils and thus shows a little change of its thrust, for which one sensor unit suffices and no additional one is necessary even in case that a coil unit is attached to increase the thrust, and which requires only three electric wires, remaining as it is in case of one coil unit, to send the current to the coils accompanied by an additional coil unit and thus does not complicate its wiring.

The foregoing object of the present invention is accomplished by providing a brushless DC linear motor which comprises a magnet body wherein several isometric magnets are arranged to alternate their magnetizing directions and put their magnetic pole-faces in a row in a perpendicular direction to this magnetizing direction, a coil body arranged along the magnetic pole-faces of this magnet body, a sensor detecting a relative position of the magnet body and coil body, and an electric flow switching means transferring the current to the coil body by means of the position detecting signal of this sensor, the brushless DC linear motor comprises three flat coils of the same shape whose empty core section and winding section has their dimension of breadth determined on $\frac{1}{3}$ of a magnetic pole-pitch of the magnet body and which is arranged in a shifted position of the magnetic pole pitch by n/3 (n is a natural number excluding multiples of 3). Terminal of each of these flat coils are connected with a star connection or with a delta connection, a sensor unit wherein three magnetic detection sensors corresponding to respective flat coils are arranged at intervals of $\frac{1}{3}+2$ m (m=0, 1, 2, 3 . . . ) of the magnetic pole-pitch of the magnet body and any of these magnetic detection sensors and its corresponding flat coils are arranged at the determined distance in reference to the magnetic pole-pitch of the magnet body, and an electric flow switching means transferring the electric flow polarity to three terminals of a star connection or a delta connection in accordance with the detection signal detecting the polarity of the magnet body of each of the magnetic detection sensors.

The dimension of breadth of the empty core section and the winding section of the flat coils and the positional relationship among the three flat coils and, the positional relationship among the three sensors are precisely determined in reference to the magnetic pole-pitch of the magnet body. Moreover, the corresponding positional relationship among the three sensors constituting the sensor unit and the three flat coils constituting the coil unit is determined and then the electric flow polarity to the three terminals of the delta connection or the star connection which connect the electric flow terminals of each flat coil is transferred by the electric flow switching means in accordance with the position detecting signal of the sensor constituting the sensor unit. The current force according to Fleming's left-hand rule is always generated in the same direction in the winding sections of at least two flat coils corresponding to the magnetic pole-faces of the magnet body in reference to the polarity of the magnetic pole-faces of the magnet body. In consequence, the relative movement can be generated between the magnet body and the coil unit.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
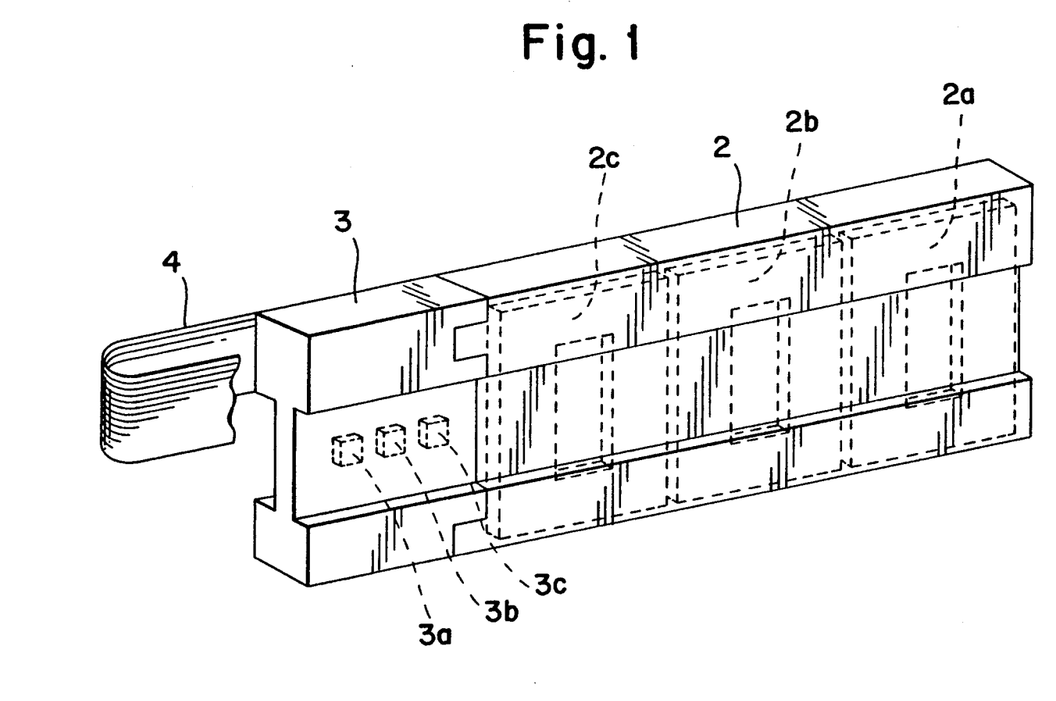
FIG. 1 of the attached drawings is a perspective view of a coil unit and a sensor unit.

Referring to FIG. 1, there is shown a perspective view of the coil unit 2 constituting the brushless DC linear motor 1 of this invention and the sensor unit 3 attached as one body to this coil unit 2.

The coil unit 2 incorporates three flat coils of the same shape 2a, 2b and 2c. And the sensor unit 3 incorporates the magnetic detection sensors 3a, 3b and 3c made of three hall elements and the like and corresponds the flat coils 2a-2c to the respective magnetic detection sensor 3a-3c. Their corresponding positional relationship will be described in details afterwards. The electric supply wire to send the current to each flat coil 2a-2c and the signal wire of each sensor 3a-3c are connected by the use of the flexible printed substrate 4.

Figure 2:
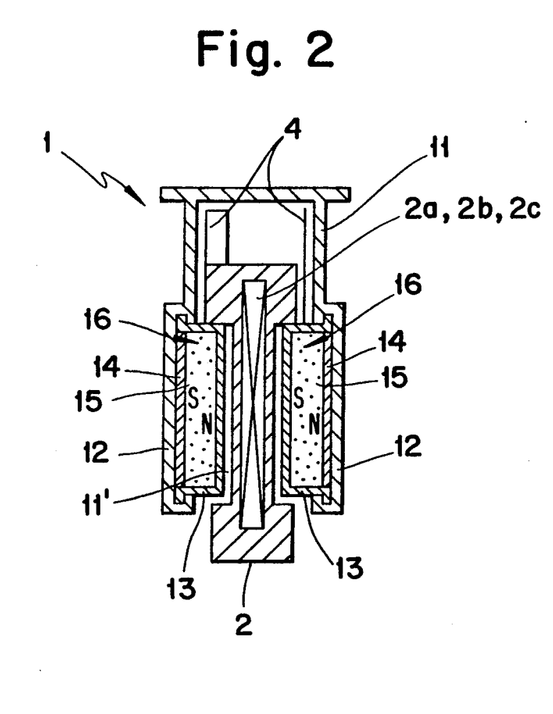
FIG. 2 is a cross sectional view.

The coil unit 2 and the sensor unit 3, as shown in the sectional view of FIG. 2, are hung and installed movably in the traveling portion 11' of the rail 11 consisting of the outer rails 12, 12 and the inner rails 13, 13 and thus constitute the brushless DC linear motor 1 of the coil traveling type.

Figure 3:
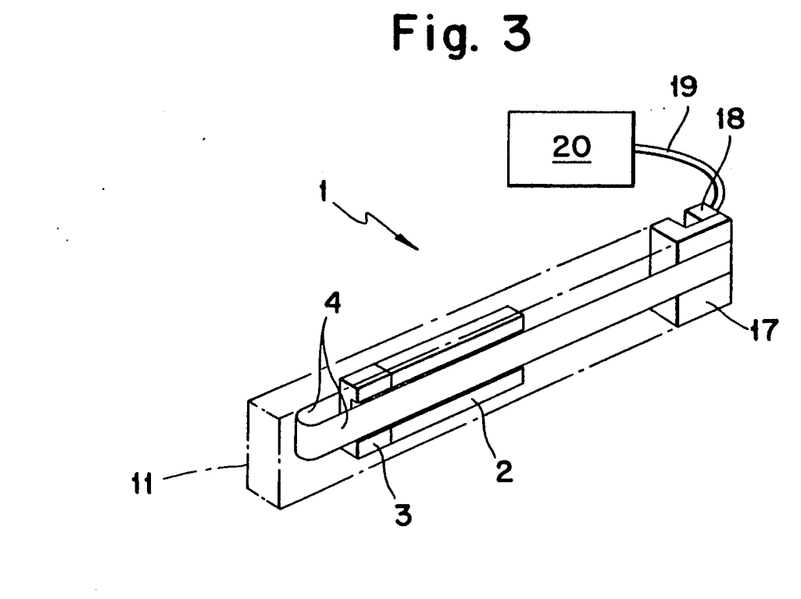
FIG. 3 is an outlined perspective view of a brushless DC linear motor.
Figure 4:
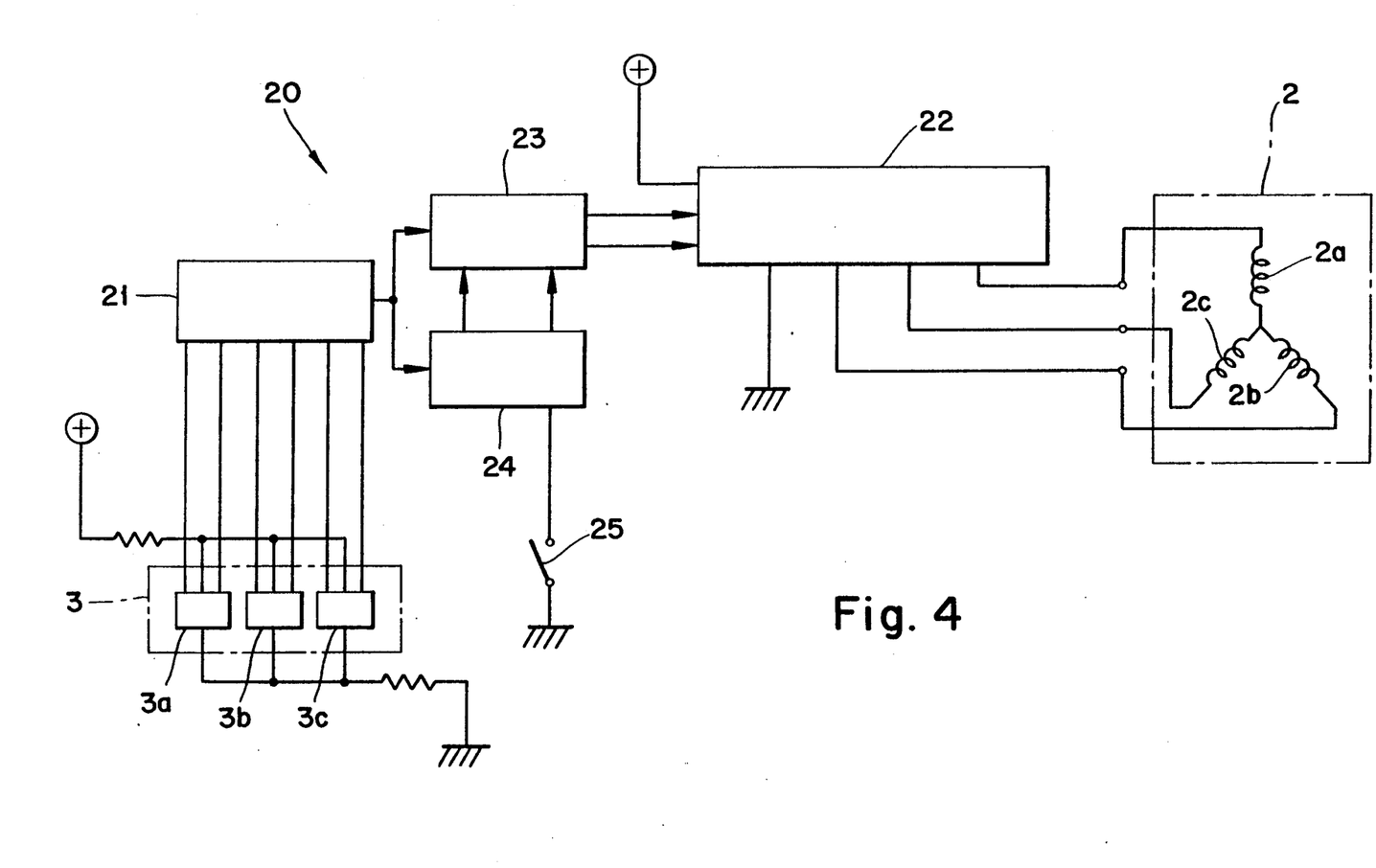
FIG. 4 is a wiring diagram for showing an example of a controlling circuit.

The magnet body 16 is constituted with the yokes 14, 14 standing between the outer rails 12, 12 and the inner rails 13, 13 and with the several permanent isometric magnets 15, 15 arranged in the longitudinal direction and moreover, their polarities are inverted between the adjacent and opposite magnets to each other. In consequence, an uniform magnetic field is formed between the magnets 15, 15 facing each other. In this case the magnetic circuit may be formed with the magnet 15 arranged on only one side and with the yoke 14 on the other side. One edge of the electric supply wire using the flexible printed substrate 4 is connected with the rail end 17 installed on the edge section of the rail 11 (FIG. 3). The wire harness 19 is connected with this rail end 17 through the connector 18. The control circuit 20 is connected with one edge of this wire harness 19. The control circuit 20 constitutes the electric flow switching means which inputs the detecting signals of the magnetic detection sensors 3a-3c to detect the relative position between the coil unit 2 and the magnet body 16 in accordance with the polarity of the magnets 15, 15 and transfers the electric flow polarity of the flat coils 2a-2c. One of the examples of the control circuit 20 is shown in FIG. 4. The control circuit 20 has the positional detection circuit 21 to input the magnetic detecting signal of the magnetic detection sensors 3a-3c and detect the relative position between the coil unit 2 (the flat coils 2a-2c) and the magnet body 16 and the electric flow switching circuit 22. Further between both circuits 21 and 22 there are installed the driving circuit 24 for driving logic switching elements of the electric flow switching circuit 22 and a moving direction control circuit 24 connected with the moving direction transfer switch 25.

The dimension and the corresponding positional relationship of the flat coils 2a-2c constituting the coil unit 2, the corresponding positional relationship of the magnetic detection sensors 3a-3c constituting the sensor unit 3 and the determination of the corresponding distance between the coils 2a-2c and the following in reference to the dimension of the isometric magnets 15.

The arranged pitch L of the flat coils 2a, 2b and 2c is $$L = 2nl/3.$$

where
n: natural number excluding multiples of 3
2 l : the magnetic pole-pitch of the magnet body 16.
And the arranged pitch M of the magnetic detection sensors 3a, 3b and 3c is;

$$M = 2l/3 + 2l \times 2m$$

where
m: 0, 1, 2, 3 ...
2 l: the magnetic pole-pitch of the magnet body 16.

The corresponding distance Nx between the flat coils 2a-2c and the magnetic detection sensors 3a-3c correspondingly respectively differentiates depending on the connection between the electric flow terminals of the flat coils 2a-2c and can be described as follows.

(1) In case of the star connection (type 1)

$$N_x = (2p_x + 1)l$$

(2) In case of the star connection (type 2)
$$N_x = 2(p_x + \tfrac{1}{3})l$$

or $$N_x = 2(p_x + \tfrac{2}{3})l$$

(3) In case of the delta connection $$N_x = 2(p_x + \tfrac{1}{3})l$$

or $$N_x = 2(p_x + \tfrac{2}{3})l$$

where
2 l = the magnetic pole pitch of the magnet body 16
p = 0, 1, 2, 3, 4 ...
x = a, b, c.

Provided that $N_a$ indicates the distance from the center of the flat coil 2a to the magnetic direction sensor 3a. The same applies to the case of $N_b$ and $N_c$. $N_b$ and $N_c$ indicates the distances from the centers of the flat coils 2b, 2c to the magnetic detection sensors 3b and 3c respectively.

Some examples of the dimension relationship prescribed as aforementioned and their actions will be explained in the following.

Figure 5:
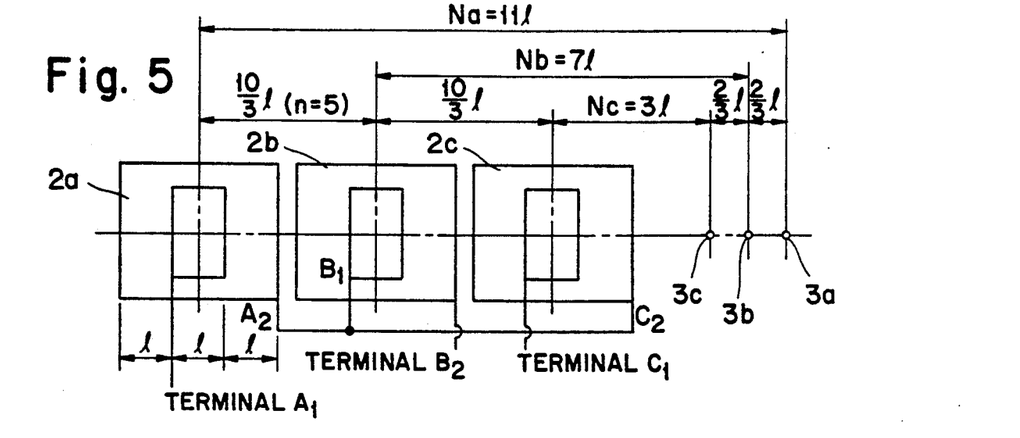
FIGS. 5–7 are explanatory figures for showing a concrete example of a dimension relationship and a condition of wiring.

FIG. 5 is an example in case of the star connection (type 1) of the (1). L=10 1/3, the distance between the flat coils 2a and 2b and between 2b and 2c, is obtained by substituting n=5 for L=2n 1/3.

And $N_a$=11 l, the corresponding distance from the center of the flat coil 2a to the magnetic detection sensor 3a, is obtained by substituting $p_a$=5 for $N_a$=(-2$P_a$+1)l, and in the same way, $N_b$=7 l by substituting $p_b$=3 for it and $N_c$=3l by substituting $p_c$=1 for it.

The start ends of winding of the flat coils 2a-2c are referred to as $A_1$, $B_1$ and $C_1$ respectively and the finish ends of winding, as $A_2$, $B_2$ and $C_2$ respectively. And the finish end of winding $A_2$ of the flat coil 2a, the start end of winding $B_1$ of the flat coil 2b and the finish end of winding $C_2$ of the flat coil 2c are connected together. Then, the star connection is applied to it.

Figure 6:
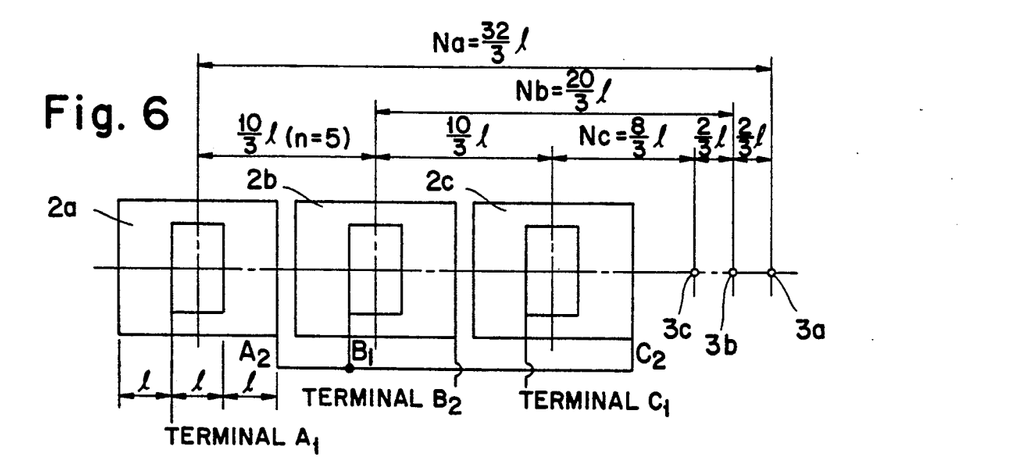

FIG. 6 shows an example in case of the star connection (type 2).

L=10 1/3, the distances between the flat coils 2a and 2b and between 2b and 2c, is obtained by substituting n=5 for L=2 nl/3.

$N_a = 32\ 1/3$, the distance from the center the flat coil $2a$ to the magnetic detection sensor $3a$, is obtained by substituting $p=5$ for $N_a = 2(p_a + \frac{2}{3})$ 1 and in the same way, $N_b = 20\ 1/3$, by substituting $p_b = 3$ it and $N_c = 8\ 1/3$, by substituting $p_c = 1$ for it.

The start ends of winding of the flat coils $2a$, $2c$ are referred to as $A_1$, $B_1$ and $C_1$ respectively and the finish end of winding $A_2$, $B_2$ and $C_2$ respectively. And the finish end of winding $A_2$ of the flat coil $2a$, the start end of winding $B_1$ of the flat coil $2a$, the start end of winding $B_1$ of the flat coil $2b$ and the finish end of winding $C_2$ of the flat coil $2c$ are connected together. Then, the star connection is applied to it.

FIG. 6 shows an example in case of the star connection (type 2).

$L = 10\ 1/3$, the distances between the flat coils $2a$ and $2b$ and between $2b$ and $2c$. is obtained by substituting $n=5$ for $L = 2\ nl/3$.

$N_a = 32\ 1/3$, the distance from the center of the flat coil $2a$ to the magnetic detection sensor $3a$, is obtained by substituting $p_a = 5$ for $N_a = 2(p_a + \frac{1}{3})l$, and in the same way, $N_b = 20\ 1/3$, by substituting $p_b = 3$ for it and $N_c = 8\ 1/3$, by substituting $p_c = 1$ for it.

The start ends of winding of the flat coils $2a$-$2c$ are referred to as $A_1$, $B_1$ and $C_1$ respectively and the finish ends of winding, as $A_2$, $B_2$ and $C_2$ respectively. And the finish end of winding $A_2$ of the flat coil $2a$, the start end of winding $B_1$ of the flat coil $2b$ and the finish end of winding $C_2$ of the flat coil $2c$ are connected together. Then, the star connection is applied to it in the same way as in case of the type 1.

Figure 7:
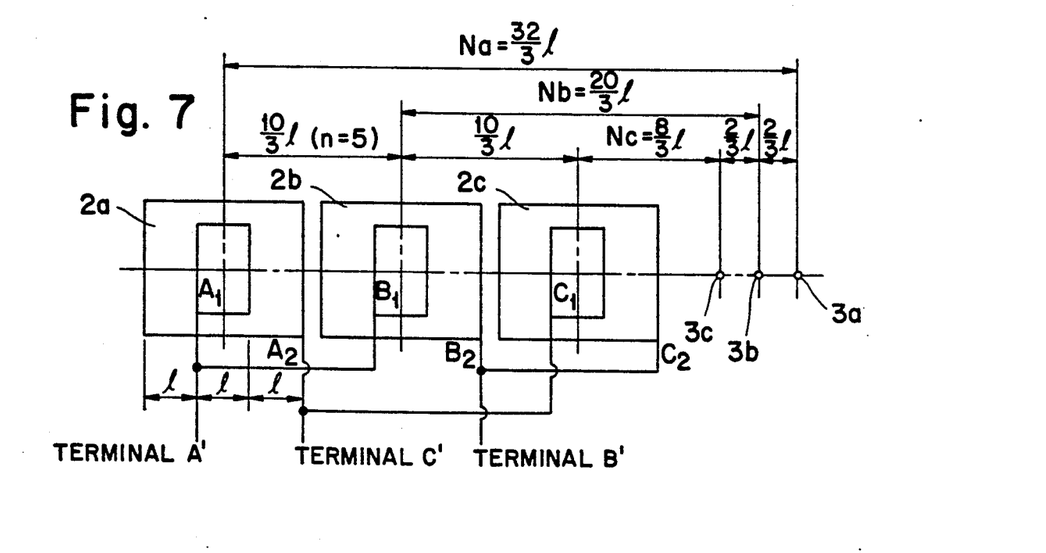

FIG. 7 shows an example in case of the delta connection.

The distances between the flat coils $2a$ and $2b$ and between $2b$ and $2c$, and the corresponding distances from the center of the flat coils $2a$-$2c$ to the respective magnetic detection sensors $3a$-$3c$ are of the same kind as in case of the star connection (type 2) (FIG. 6).

The start end of winding of the flat coils $2a$-$2c$ are referred to as $A_1$, $B_1$ and $C_1$ respectively and the finish end of winding, as $A_2$, $B_2$ and $C_2$ respectively. And $A_1$ is connected with $B_1$, and in the same way, $A_2$, with $C_1$ and $B_2$ with $C_2$. Their terminals are referred to as $A'$, $C'$ and $B'$ respectively and the delta connection is applied to them.

The action of the brushless DC linear motor 1, which arranges the flat coils $2a$-$2c$ and the magnetic detection sensors $3a$-$3c$ in the coil unit 2 and the sensor unit 3 respectively, prescribing each of their dimension relationship, and which is hung and installed in the rail 11, as mentioned above, will be explained on reference to FIG. 8–FIG. 10.

Figure 8:
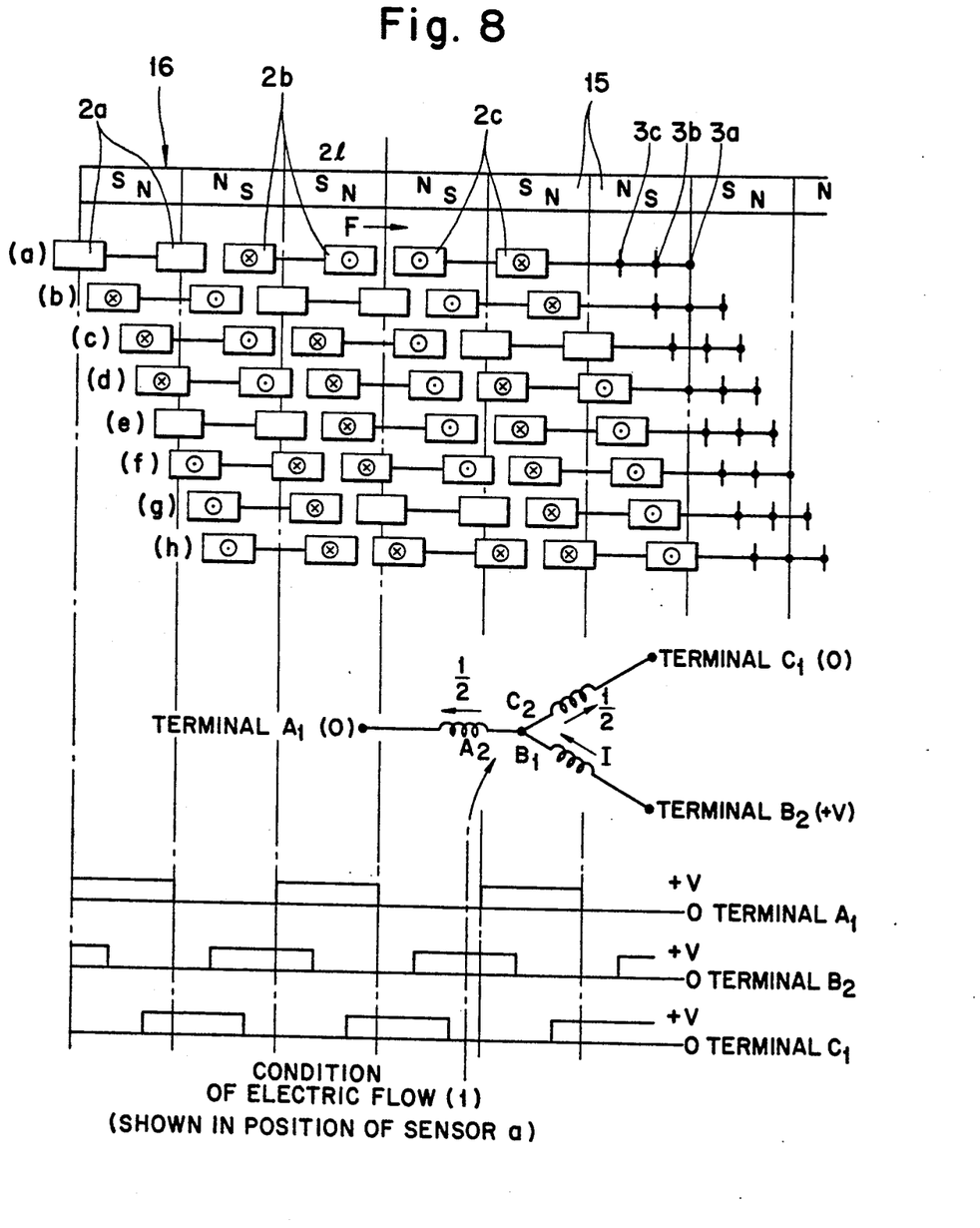
FIGS. 8–10 are explanatory figures for showing schematically the relationship between the current direction flowing into each of the flat coils which switch the electric flow polarity and the magnet body.

In case of the star connection (type 1) as shown in the FIG. 5, the electric flow switching circuit 22 of the control circuit 20 is controlled to impress $+V$ (v) on the terminal A when the magnetic detection sensor $3a$ corresponds to the N pole of the magnet body 16 and 0 (v), when it corresponds to the S pole. And in the same way, it is controlled to impress 0 (v) on the terminal B when the magnetic detection sensor $3b$ corresponds to the N pole and $+V$ (v), when it corresponds to the S pole, and it is also controlled to impress $+V$ (v) on the terminal C when the magnetic sensor $3c$ corresponds to the N pole and 0 (v), when it corresponds to the S pole, as shown in FIG. 8. The condition of the electric flow to the terminals $A_1$, $B_2$ and $C_1$ at this point depending on the magnetic detection timing of the respective magnetic detection sensors $3a$-$3c$ is a timing shown in this figure if it is indicated as the position of the magnetic detection sensor $3c$. For example, in case of the position (1) of the magnetic detection sensor $3a$, all of the magnetic detection sensors $3a$, $3b$ and $3c$ which are shifted by $2\ 1/3$ correspond to the S pole and 0 (v) is impressed on the terminals $A_1$ and $C_1$ and $+V$ (v), on the terminal $B_2$. And the current flows from $B_2$ to $B_1$, from $A_2$ to $A_1$ and from $C_2$ to $C_1$ through the star connection in the flat coils $2a$-$2c$.

As aforementioned, the condition of the electric flow to the three terminals $A_1$, $B_2$ and $C_1$ of the star connection changes, depending on the magnetic detection signal which the magnetic detection sensors $3a$-$3c$ output in accordance with the polarity of the magnet body 16 and the direction of the current flowing into the flat coils $2a$-$2c$ switches successively depending on the timing. And at this point, the flat coils $2a$-$2c$ are situated in such a position as prescribed by the dimension relationship, receive the action of the thrust according to Flemming's left-hand rule, depending on the direction of the current flowing in each of the winding sections and the corresponding polarity of the magnet body 16 and successively from the left to the right, as shown schematically in FIG. 8 (a)–(h).

Figure 9:
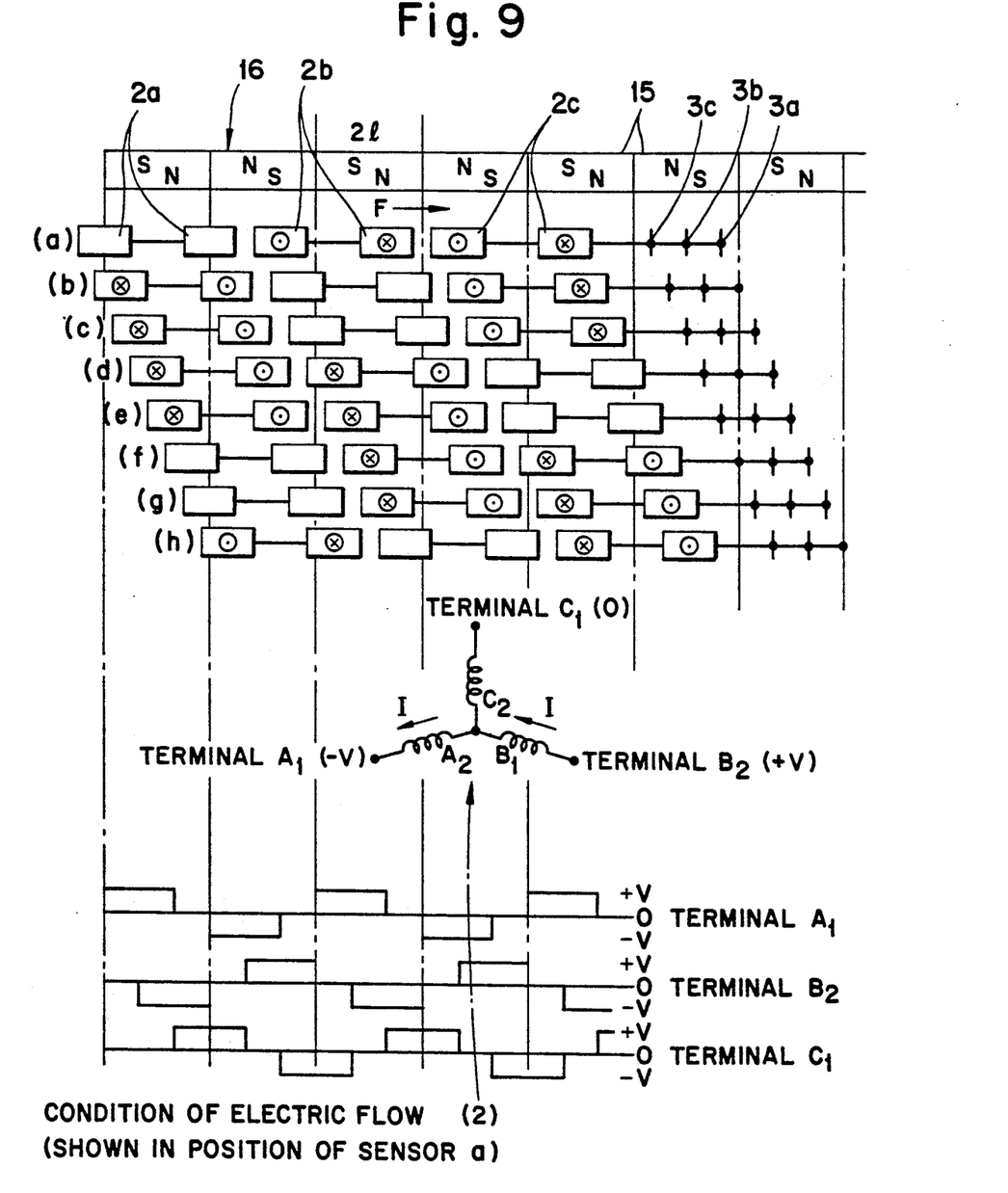

In case of the star connection (type) shown in the FIG. 6, the condition of the electric flow to send the current to the terminals $A_1$, $B_2$ and $C_1$ are referred to as $+V$ (v), 0 (v) and $-V$ (v) respectively, as shown in FIG. 9, and its switching timing is a timing shown in FIG. 9 if it is indicated as the position of the magnetic detection sensor $3a$. For example, at the position (2) of the magnetic detection sensor $3a$, $-V$ (v) is impressed on the terminal $A_1$ and $+V$ (v) on $B_2$ and 0 (v) on $C_1$. Then, the electric potential of the connecting point of the terminals $A_2$, $B_1$ and $C_2$ to which the star connection is applied always indicated 0 (v) and the current does not flow to the terminal $C_1$ (0 (v)) but flows from the terminal $B_2$ to $B_1$ and from $A_2$ to $A_1$.

In this case, in the same way as aforementioned, the flat coils $2a$-$2c$ receive the thrust according to Flemming's left-hand rule, depending on the direction of the current flowing into each of the winding sections of the flat coils $2a$-$2c$ and the corresponding polarity of the magnet body 16 and move successively from the left to the right, as shown schematically in FIG. 9 (a)–(h).

Figure 10:
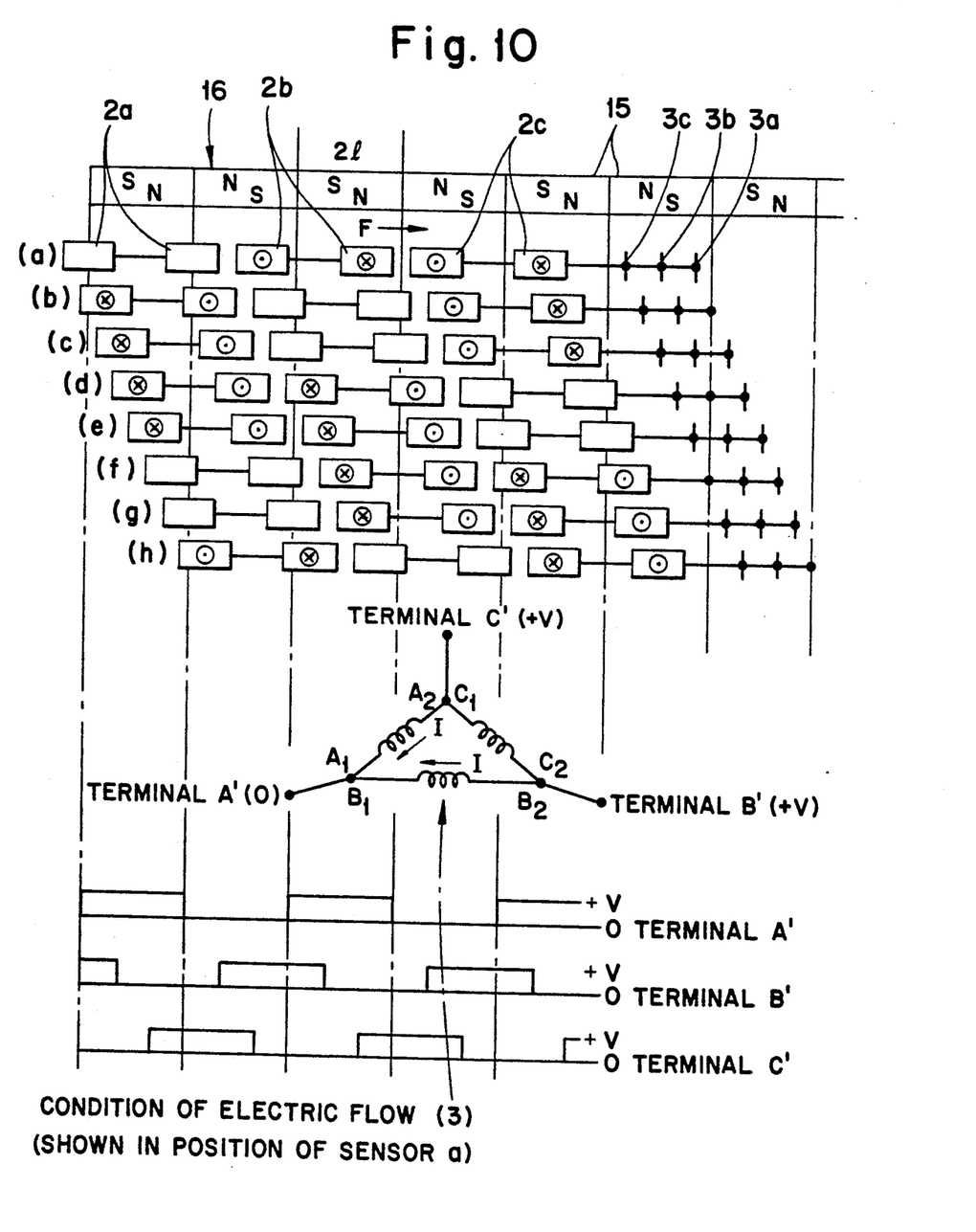

In case of the delta connection shown in the FIG. 7, the electric flow switching circuit 22 of the control circuit 20 is controlled to impress $+V$ (v) on the terminal $A'$ when the magnetic detection sensor $3a$ corresponds to the N pole of the magnet body 16 and 0 (v), when it corresponds to the S pole. And in the same way, it is controlled to impress 0 (v) on the terminal $B'$ when the magnetic detection sensor $3b$ corresponds to the N pole and V (v), when it corresponds to the S pole, and it is also controlled impress $+V$ (v) on the terminal $C'$ when the magnetic detection sensor $3c$ corresponds to the N pole and 0 (v), when it corresponds to the S pole, as shown in FIG. 10. The condition of the electric flow to the terminals $A'$, $B'$ and $C'$ at this point depending on the magnetic detection timing of the respective magnetic detection sensors $3a$-$3c$ is a timing shown in this FIGURE if it is indicated as the position of the magnetic detection sensor $3a$. For example, in case of the position (3) of the magnetic detection sensor $3a$, all of the magnetic detection sensors $3a$, $3b$ and $3c$ which are shifted by $2\ 1/3$, correspond to the S pole and 0 (v) is impressed on the terminals $A'$ and $+V$ (v), on the terminals $B'$ and $C'$. The current does not flow between the terminal B' and the terminal C' whose electric potential indicate the same because of the delta connection but flows from $A_2$ to $A_1$ and from $B_2$ to $B_1$.

In this case, in the same way as aforementioned, the flat coils $2a$-$2c$ receive the thrust according to Flemming's left-hand rule, depending on the direction of the current flowing into each of the winding sections of the flat coils $2a$-$2c$ and the corresponding polarity of the magnet body 16 and move successively from the left to the right, as shown schematically in FIG. 10 $(a)$-$(h)$.

Figure 11:
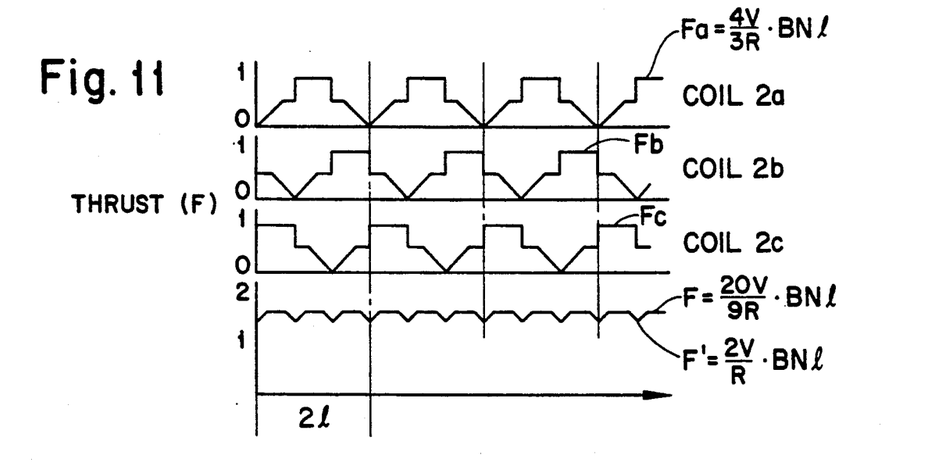
FIG. 11–FIG. 13 are diagrams for showing the patterns of the thrust which occurs.
Figure 12:
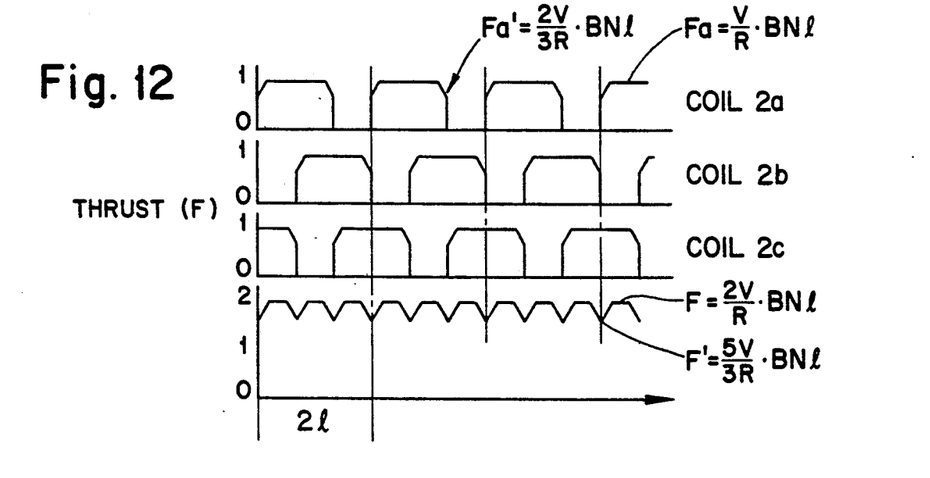
Figure 13:
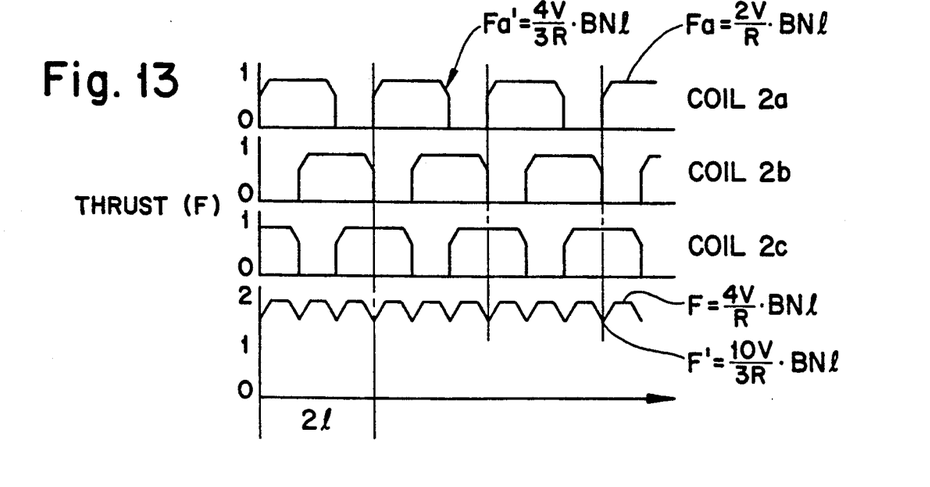

The thrusts Fa, Fb and Fc, which act on the respective flat coils $2a$-$2c$ in case of the star connections (type 1), (type 2) and the delta connection, are shown in FIG. 11-FIG. 13 respectively when the magnetic field is kept uniform. where
 V: voltage
 R: resistor of a coil
 B: magnetic flux density
 N: winding number of a coil
 l: operating length of magnetic flux.
In case of the star connection (type 1);
$$F_a = F_b = F_c = (4V/3R) \cdot BNl$$

is applied, as shown in FIG. 11. The thrust pattern generates a 2 1/3 phase shift according to the dimension relationships, such as those of the flat coils $2a$-$2c$ and the magnet body 16, and the maximum thrust to act on the coil unit 2 is;

$$F = (20V/9R) \cdot BNl.$$

And the decline of the thrust which occurs at every 2 1/3 is;

$$F = (2V/R) \cdot BNl.$$

Thus, the change of the thrust can be restricted to 10% of the maximum thrust.

In case of the star connection (type 2);

$$Fa = Fb = Fc = (V/R) \cdot BNl,$$

and $$Fa' = Fb' = Fc' = (2V/3R) \cdot BNl$$

are applied, as shown in FIG. 12. And the maximum thrust is;

$$F = (2V/3R) \cdot BNl$$

and the decline of the thrust which occurs at every 2 1/3 is;

$$F = (5V/3R) \cdot BNl.$$

Thus, the change of the thrust can be restricted to 17% of the maximum thrust.

In case of the delta connection;

$$Fa = Fb = Fc = (2V/R) \cdot BNl,$$

and $$Fa' = Fb' = Fc' = (4V/3R) \cdot BNl$$

are applied, as shown in FIG. 13.
The maximum thrust F is;

$$F = (4V/R) \cdot BNl$$

and the decline of the thrust which occurs at every 2 1/3 is;

$$F = (10V/3R) \cdot BNl.$$

Thus, the change of the thrust can be restricted to 17% of the maximum thrust.

The brushless DC linear motor 1 which has such constitution and actions as aforementioned can not only aim at better durability and the reduction of the electric noise because of being brushless but also perform controllability because the traveling part becomes coreless on account of little change of the thrust and the traveling coil.

Furthermore, several coil units 2 can be attached in order to increase the thrust.

In this case, the star connection or the delta connection is applied in order to get every winding of the flat coils $2a$-$2c$ which constitute each of the coil units 2 and 2' reversed in every adjoining coil units, depending on the dimension relationship between the magnet body 16 and each of the flat coils $2a$-$2c$.

Figure 14:
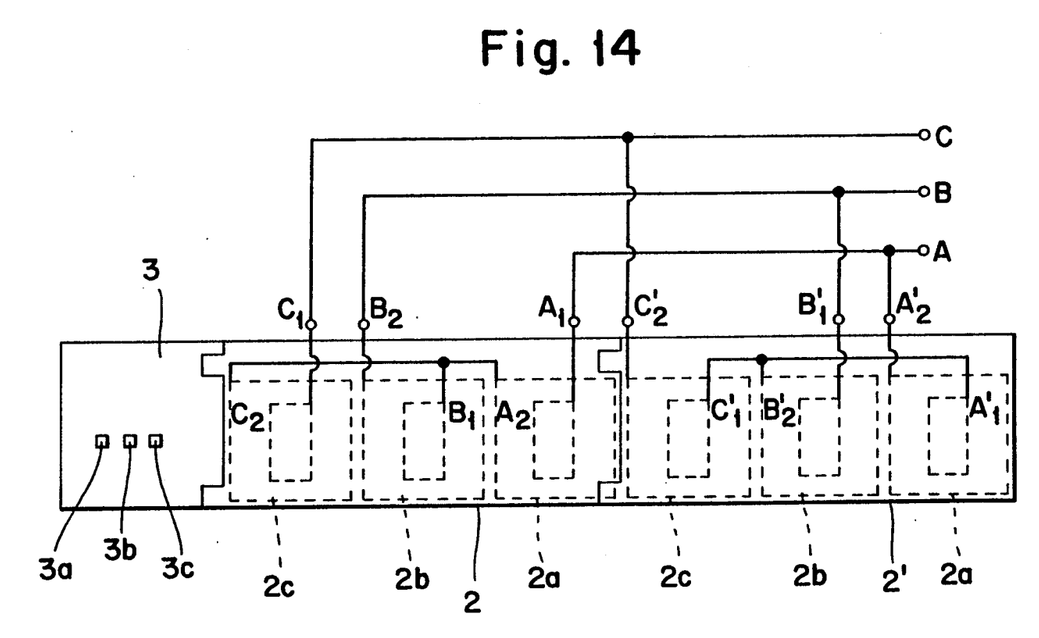
FIG. 14 is a front view of a coil unit and a sensor unit for showing other embodiments.

As shown in FIG. 14, the finish end of winding $A_2$ of the flat coil $2a$, the start end of winding $B_1$ of the flat coil $2b$ and the finish end if winding C of the flat coil $2c$ are connected with the wire in the coil unit 2 and the start end of winding $A_1'$ of the flat coil $2a$, the end of winding $B_2'$ of the flat coil $2b$ and the start end of winding $C_1'$ of the flat coil $2c$ are connected with the wire in the coil unit 2'. As for the three terminals $A_1$, $B_2$ and $C_1$ of the coil unit 2 and the three terminals $A_2'$, $B_1'$ and $C_2'$ of the coil unit 2', $A_1$ and $A_2'$, $B_2$ and $B_1'$, and $C_1$ and $C_2'$ are connected together to be the common terminals A, B and C respectively. Thus, even in case that several coil units 2 are attached, the number of wires to switch the electric flow polarity of the flat coils $2a$-$2c$ is three, remaining as it is in case of one coil unit, and does not need to increase. A pair of the magnetic detection sensors $3a$-$3c$ to control the switching timing of the electric flow polarity will suffice regardless of the number of the coil units 2.

The arranged positions of the magnetic detection sensors $3a$-$3c$ are not restricted by the positions shown in each of the embodiments and any position will suffice as far as it effectuates the switching timing of the electric flow polarity.

Further, in case that the moving direction is reversed, the electric flow polarity will be switched to send the reverse current to the embodiment into each of the flat coils.

What is claimed is:
1. A brushless DC linear motor, comprising:
 a magnet body in which several isometric magnets are arranged to alternate their magnetizing directions, magnetic pole-faces of the magnets aligned in a row in a perpendicular direction to the magnetizing direction;
 a coil body arranged along the magnetic pole-faces of said magnet body;
 sensor means for detecting a relative position of said magnet body and coil body;
 electric flow switching means transferring an electric flow to said coil body by means of the position detecting signal of said sensor means;
 said coil body including a coil unit in which electric flow terminals of each of a plurality of flat coils are connected with a star connection or with a delta connection;

said plurality of flat coils having substantially the same shape with a core section and winding section have a dimension based on ½ of a magnetic pole-pitch of said magnet body and arranged in a shifted position of the magnetic pole-pitch by n/3 (n being a natural number excluding multiples of 3) on said coil body;

said sensor means including a sensor unit in which three magnetic detection sensors corresponding to a respective one of the flat coils are arranged at intervals of ⅓+2 m (m=0, 1, 2, 3, ...) of the magnetic pole-pitch of said magnet body, the magnetic detection sensors and its corresponding flat coil arranged at a predetermined distance with the magnetic pole-pitch of said magnet body; and said electric flow switching means transferring the electric flow polarity to three terminals of a star connection or a delta connection in accordance with a signal from each of the magnetic detection sensors detecting the polarity of said magnet body.

2. A brushless DC linear motor as defined in claim 1 wherein said sensor unit is attached as one body to said coil unit.

3. A brushless DC linear motor as defined in claim 1 wherein said magnetic detection sensors incorporated in said sensor unit are made of Hall elements.

4. A brushless DC linear motor as defined in claim 1 wherein an electric supply wire to send the current to said flat coil and a signal wire of said sensor are made of a flexible printed substrate.

5. A brushless DC linear motor as defined in claim 1 wherein said magnet body is constituted with yokes standing between outer rails and inner rails and with said several permanent isometric magnets arranged in the longitudinal direction, whose polarities are inverted between the adjacent and opposite magnets to each other so that an uniform magnetic field is formed between the magnets facing each other.

6. A brushless DC linear motor as defined in claim 1 wherein said coil unit and said sensor unit are installed movably in the traveling portion of a rail consisting of outer rails and inner rails and thus constitute a coil traveling type linear motor.

7. A brushless DC linear motor as defined in claim 1 wherein said electric flow switching means is constituted by a control circuit which has a positional detection circuit for detecting the relative position between the coil unit and the magnet body, an electric flow switching circuit, and between the detection circuit and the switching circuit a driving circuit for driving logically switching elements of the switching circuit and a moving direction control circuit connected with a moving direction transfer switch.

8. A brushless DC linear motor as defined in claim 1 wherein a plurality of said coil units are connected.

* * * * *